United States Patent [19]
Rusanova et al.

[11] Patent Number: 5,849,242
[45] Date of Patent: Dec. 15, 1998

[54] BORON NITRIDE

[75] Inventors: Lydia Nikolaevna Rusanova, Ulitsa Gagarin; Alexander Gavrilovia Romashin, Ulitsa Gorkii; Lydia Ivanovna Gorchakova, Ulitsa Marx; Galina Ivanovna Kulikova, Ulitsa Engels; Michael Kirillovia Alexeev, Ulitsa Lenin, all of Russian Federation

[73] Assignee: British Technology Group Limited, London, England

[21] Appl. No.: 809,050

[22] PCT Filed: Aug. 25, 1995

[86] PCT No.: PCT/GB95/02022

§ 371 Date: Mar. 7, 1997

§ 102(e) Date: Mar. 7, 1997

[87] PCT Pub. No.: WO96/07623

PCT Pub. Date: Mar. 14, 1996

[30] Foreign Application Priority Data

Sep. 7, 1994 [RU] Russian Federation ............ 94032296

[51] Int. Cl.⁶ ...................... C04B 35/583; C04B 35/5835
[52] U.S. Cl. .......................... 264/625; 264/604; 264/626; 264/647; 264/649; 501/96.4
[58] Field of Search .................................. 264/647, 604, 264/649, 625, 626; 501/96.4

[56] References Cited

U.S. PATENT DOCUMENTS

| | | |
|---|---|---|
| 3,241,919 | 3/1966 | O'Connor . |
| 4,110,386 | 8/1978 | Yajima et al. .......................... 264/625 |
| 4,665,830 | 5/1987 | Akashi .................... 264/649 |
| 5,334,339 | 8/1994 | Nakashima ............................. 501/96.4 |
| 5,602,062 | 2/1997 | Sato ..................... 501/96.4 |

FOREIGN PATENT DOCUMENTS

| | | |
|---|---|---|
| 0 368 069 | 5/1990 | European Pat. Off. . |
| 2 187 477 | 9/1987 | United Kingdom . |

OTHER PUBLICATIONS

Chemical Abstracts, vol. 94 (1981) pp. 35297, 35300r.
Rusanova et al. "Sintering of turbostratic–structure . . . " Soviet Powder Metallurgy and Metal Ceramincs, vol. 28 No. 2, 1989, pp. 109–110.
Romashin, A.G. "Refractory material for high temp. Heat . . . " SU 635074, A. 781130, 7936 (basic). Dialog Information Services, File 250, World Patent Index 63–80, Dialog accession No. 002266773, WPI accession No. 79–65977B/36.
Problems and Perspectives in the Development of Boron Nitride Ceramics–Authors: L N Rusanova, A G Romashin, G I Kulikova, O P Golubeva. Powder Metallurgy Reprinting Kiev–198.
Reactive Sintering of Boron Nitride–Authors: L N Rusanova, L I Gorchakova, A G Romashin, Translated from Poroshkovaya Metallurgiya, No. 12(204) pp. 52–56, Dec. 1979.
Ceramics Based on Boron Nitride–Author: L N Rusanova. Translated from Ogneupory, No. 12, pp. 13–15, Dec. 1988.

*Primary Examiner*—James Derrington
*Attorney, Agent, or Firm*—Nixon & Vanderhye

[57] ABSTRACT

Boron nitride articles are made by heat treating turbostratic BN powder to reduce its oxygen content to 5–8% (mesographitic BN), washing this heat-treated powder, mixing it with 5–8% amorphous boron, shaping the mixture, explosively compacting the shape by a hydrodynamic method and reaction sintering the compacted shape, to form the article.

The article is then buried in a powder mixture of BN and SiC and heat treated, to getter residual $B_2O_3$.

After this, the article is impregnated with low-viscosity oligomers (MW<1000) of methylsilanes selected to yield a high proportion of SiC on pyrolysis, and the article is heat-treated to fill the pores evenly throughout its thickness with SiC.

30 Claims, No Drawings

BORON NITRIDE

This invention relates to a method of making ceramic articles, especially from boron nitride (BN), and extends to the articles so made. Boron nitride articles are used in the electronic, electric, radio, metallurgical, atomic and rocket industries as high-temperature dielectric electrical insulation components, crucibles, boats for glass synthesis and smelting, metal alloys, monocrystal growing, evaporator-kettles, various devices for melting and pouring metals and alloys, refractory ceramics and structural components for gas turbine engines.

Three main routes to consolidate boron nitride are currently practised: pyrolysis, hot-pressing and reaction-sintering of cold-pressed blanks.

Pyrolytic boron nitride obtained by vapour deposition from boron halides has high purity and density and is of the highest quality, maintaining and in fact steadily increasing its strength when heated from 20° C. to 1400° C. and beyond. However, pyrolysis is a complicated and energy-consuming process, involving expensive manipulations to filter out harmful effluent gases. Also, the maximum practical thickness of pyrolytic boron nitride articles which can be manufactured is about 5 mm.

Hot-pressing—the process of simultaneous moulding and sintering in graphite press-moulds at 1800°–2200° C.—is a cheaper method of producing boron nitride articles. These show high density and strength but contain 10 to 15% of easy-melting phase of boric anhydride and lose virtually all of their structural strength at temperatures above 1000° C. Besides, hot-pressed boron nitride materials also have highly anisotropic properties, although less so than pyrolytic materials.

Clearly it would be desirable to devise a boron nitride material having the strength at high temperatures of pyrolytic boron nitride while retaining the advantages of hot pressed boron nitride of cheapness, low pollution and fabricability of thick samples.

The known method of sintering cold-pressed blanks of boron nitride, in other words through first shaping and then firing, as separate operations, is a step in this direction. The resulting material shows considerable porosity (up to 40%) and a strength of no more than 10–20 MPa, which is obviously insufficient for a whole range of uses.

Thus Rusanova and Gorchakova have noted (Soviet Powder Metallurgy 1989 28(2) 108) that the problem of sintering of boron nitride is directly related to its structure. Boron nitride has a basic structural element which is flat sheets of hexagonal rings with alternating B and N atoms having strong and primarily covalent bonds; cohesion between the sheets occurs primarily as the result of weak intermolecular interaction. The sheets stack to form flat, thin plates up to 50 nm thick with regular angles. In such a structure, only incomplete linking of the particles at the crystal faces is possible and linking at an angle to the hexagon does not in practice occur.

Production of a self-bonded ceramic has become possible as the result of development of methods of synthesis of turbostratic-structure boron nitride, for example as disclosed in U.S. Pat. No. 3,241,919. Turbostratic boron nitride has a semi-amorphous structure in which groups of approximately parallel sheets are shifted at random or are rotated relative to the normal. The above researchers also established that the existence of packing defects in the stacking of the sheets is caused by the presence of oxygen between the sheets. This fact is of particular importance in the technology of shaping articles by explosive compaction of powder, since the article pressed from powder retains, after the explosion, all its oxygen and hence all its potential for sintering, which is realised in the following way: the oxygen chemically linked to the boron in turbostratic boron nitride powder causes a deficit of nitrogen, and when the temperature is increased sufficiently to rupture the B—O bonds, the oxygen leaves the structure, leaving uncompensated bonds with the help of which boron-to-boron "joining" of the hexagon sheets occurs. Proceeding from this insight into the mechanism of sintering articles pressed from turbostratic powders, Rusanova and Gorchakova (ibid) developed a method of reaction-sintering that is the technological solution closest to the present invention and is as follows.

A turbostratic boron nitride powder is pre-mixed with 10–50% mass of amorphous boron; pressing is carried out under 1–2 tonne/cm$^2$ pressure. The pressed powder is fired at 1400°–1800° C. in nitrogen for the time necessary to complete the reaction of nitriding throughout the entire bulk of the article (USSR Inventor's Certificate No. 635074 of Aug. 7th, 1978). The method is effective in producing refractory articles.

Problems with this method include: the difficulty of completely nitriding the boron in a thick-walled article;

the difficulty of removing the boric anhydride which is formed when sintering a turbostratic boron nitride/boron mixture, containing oxygen in the structure of the boron nitride; and the internal stresses generated by nitriding a large quantity of amorphous boron which, unevenly distributed in the matrix of turbostratic boron nitride, increases in volume by a factor of 2–3. The use of this method is thus limited to manufacturing articles of certain sizes only, it being unsuitable for making articles with less than 1% by mass of $B_2O_3$ and with walls thicker than 5–7 mm.

UK Patent Application GB 2187477A discloses a hot-pressed sintered ceramic product of 5 mm wall thickness of boron nitride, titanium diboride and aluminium nitride.

Cold-moulded (oxygen-containing) turbostratic boron nitride, sintered at 1800°–2000° C. to drive off the oxygen and yield as pure an ordered hexagonal boron nitride as possible, has a reasonable strength (about half that of pyrolytic boron nitride), which it maintains from 0° C. to 1400° C., significantly outperforming hot pressed boron nitride at all temperatures above 500° C.

The invention envisages that in order to activate the process of sintering of boron nitride, finely dispersed metal powders are added to the disordered structure BN powder.

According to the invention, a method of making a boron nitride ceramic article from a mixture of mesographitic boron nitride powder and a reaction sintering agent other than elemental boron powder, comprises shaping the mixture into the form of the article, compacting the shaped mixture under pressure and reaction sintering the compacted mixture in a vacuum or inert or nitrogen atmosphere, characterised in that the mesographitic boron nitride contains from 5 to 10% by mass chemically bound oxygen, and that the reaction sintering agent is at least stoichiometrically equivalent to the chemically bound oxygen and can react chemically with the available B, N and/or O under the sintering conditions to form only refractory compounds plus, permissibly, a minor proportion of volatile products. It will be appreciated that "mesographitic" describes an intermediate range between the completely disordered turbostratic structure of BN and the completely ordered graphitic structure of BN. The metal should be chosen such that, upon interacting with the firing gas medium and the matrix of BN, it will produce refractory nitrides, oxides and borides, products with a higher molar volume than that of the component added to the mixture, and should also be such that its reaction is accompanied by a detectable exothermal effect. By exploiting the volume-increasing and thermal effects of the reaction, materials of satisfactory structural strength can be obtained under relatively mild firing conditions, that is, at temperatures up to 1800° C. and nitrogen pressure no more than 0.06 MPa. The quantity of metal powders added to the mixture may be 5–50% by mass. Their specific surface is preferably not less than 10 $m^2/g$. These can be aluminium, titanium or silicon powders, or mixtures thereof, optionally also including boron, or compounds forming these metals in the course of firing. The method of reaction sintering can be used to obtain a number of various materials; from highly pure boron nitride, if boron is the added metal, to composite materials of complex structure containing up to five different compounds. Thus, also according to the invention, a method of making a boron nitride ceramic article from a mixture of mesographitic boron nitride powder and elemental boron powder, comprises shaping the mixture into the form of the article, compacting the shaped mixture under pressure and reaction sintering the compacted mixture in a vacuum or nitrogen atmosphere, wherein the mesographitic boron nitride contains from 5 to 10% by mass chemically bound oxygen, and the elemental boron is at least stoichiometrically equivalent to the chemically bound oxygen, further comprising the step of impregnating the resulting article with an organosilicon compound, which is itself liquid or which is in the form of a solution (preferably oxygen-free), the organosilicon compound having a molecular weight not exceeding 1000, and heat-treating the impregnated article at 600°–1700° C. in a vacuum or inert atmosphere. The compaction may be hydrodynamic. To make a complex shape such as a crucible, hydrodynamic compaction would be preferred, e.g. done under 50–300 MPa, for example by an explosive shock wave in a hydraulic fluid surrounding the shaped mixture, but to fabricate a flat article, static compaction would be suitable. Also according to the invention, a method of making a boron nitride ceramic article from a mixture of mesographitic boron nitride powder and elemental boron powder, comprises shaping the mixture into the form of the article, hydrodynamically compacting the shaped mixture by an explosive shock wave in a hydraulic fluid surrounding the shaped mixture, and reaction sintering the compacted mixture in a vacuum or nitrogen atmosphere, wherein the mesographitic boron nitride contains from 5 to 10% by mass chemically bound oxygen, and the elemental boron is at least stoichiometrically equivalent to the chemically bound oxygen.

A distinguishing feature of reaction sintering of boron nitride according to the invention is that the matrix of disordered-structure BN is active and the properties of the resulting ceramic are due less to the interaction between the added metal and the firing gas medium, as the definition of reaction-sintering may suggest, but are due more to the structural changes in the matrix of BN, accompanied by the removal of oxygen and, consequently, to the reaction of BN with the metal additives, resulting in the formation of oxides, borides, oxynitrides and other compounds. Thus, the composition and properties of the final ceramic are crucially influenced by the type of starting BN powder structure and the amount of oxygen it contains, and also by the amount of metal powders added, the gas medium and the firing temperature.

According to the most general formulation of the present invention, a method of making a boron nitride ceramic article from a mixture of mesographitic boron nitride powder and elemental boron powder comprises shaping the mixture into the form of the article, compacting the shaped mixture under pressure and reaction sintering the compacted mixture in a vacuum or nitrogen atmosphere, and is characterised in that the mesographitic boron nitride contains from 5 to 10% by mass chemically bound oxygen, and in that the elemental boron is at least stoichiometrically equivalent to the chemically bound oxygen. The elemental boron may be amorphous or crystalline, preferably being in the form of powder with specific surface of at least 10 $m^2/g$, and may account for 5–8% by mass of the mixture.

The starting boron nitride in each case is preferably turbostratic which, before mixing with the elemental boron or other reaction sintering agent, has been heat treated to equilibrium (e.g. 1 hour or more) at a temperature of from 1300° to 1500° C., preferably in an inert atmosphere or vacuum, reducing its oxygen content from preferably ~15% to 5–10% thus partially converting the boron nitride from a turbostratic to a mesographitic structure. Its specific surface is preferably at least 100 $m^2/g$. The boron nitride is preferably washed (e.g. in water or alcohol or other suitable solvent) to remove boric anhydride $B_2O_3$ to a level of preferably 1½% by mass or less before mixing with boron.

The invention is based generally on the principle of reaction sintering in an active matrix, that is, chemical interaction of the matrix with a reaction sintering agent, for example sintering of the BN—B system (as set forth above). Other examples would include the BN—Al (and BN—Al—Si) systems. Under heating, the reaction between chemically bound oxygen of BN and (in this example) aluminium, as well as between nitrogen and aluminium, will proceed and in the long run a refractory composite ceramic with BN—$Al_2O_3$—AlN will be formed.

For each specific intended use of the resulting ceramic, the oxygen content in the BN powder and the amount of the addition of reaction sintering agent may be adjusted, and by carrying out the firing in vacuum, inert gas or nitrogen in separate stages, it is possible to obtain composite materials with the required composition, containing hexagonal boron nitride as the main component, and possibly nitrides, oxides, borides, oxynitrides and some more complex phases (such as sialon and mullite), in various proportions, as additions.

According to the invention, a method of producing ceramic articles from boron nitride comprises semi-dry shaping the mixture of oxygen containing BN powders active for sintering, characterised in that with the aim to carry out effective low-temperature sintering of large dimensional intricate shapes without application of low-melting additives, to maintain isotropic properties and stable physical-technical characteristics at high temperatures, BN powder of disordered structure with chemically bound oxygen (containing up to 10% by weight of structurally bound oxygen) is heat treated at temperature 1300°–1500° C. in inert atmosphere, then washed in water or lower alcohol, mixed with a reaction sintering agent, the latter being in the form of chemical elements and/or compounds capable of forming refractory compounds out of nitrides, oxides, borides through chemical interaction with the said oxygen from the BN under the conditions of sintering in nitrogen, inert gas or vacuum. The reaction sintering agent is finely divided powder either of metallic boron as already mentioned, or of other raw materials such as aluminium, silicon, titanium or a mixture of such powders, powder hydrides of the above-mentioned metals, or their organic compounds. Examples of these raw materials are:

| Raw materials | Composition of ceramics produced: |
|---|---|
| BN + B | BN |
| BN + Al | BN + $Al_2O_3$ + AlN + $9Al_2O_3.2B_2O_3$ |
| BN + Ti | BN + $TiB_2$ + TiB + TiN |
| BN + B + Al | BN + $Al_2O_3$ + AlN + AlB |
| BN+ Al + Si | BN + sialon |
| BN+ Al + B + Si | BN + sialon |
| BN+ Ti + Al | BN + AlN + $Al_2O_3$ + $TiB_2$ + TiN |
| BN + Ti + B | BN + $TiB_2$ + TiB |
| BN + $TiH_2$ | BN + $TiB_2$ + TiB |
| BN + $B_{10}H_{12}.2NH_3$ | BN |
| BN + meta-$B_{10}C_2H_{10}(CH_2OH)_2$ (meta-carborandiol) | BN |
| BN + poly-carboranosilanes or polycarbo-boro-siloxanes | BN + SiC + $Si_3N_4$ |

The reaction sintering is preferably performed in nitrogen which at least occasionally exceeds 0.03 MPa (preferably exceeds 0.2 MPa), optionally with pressure cycling to allow, alternately, gaseous products (principally $B_2O_3$) to escape and nitrogen to infiltrate the compacted mixture.

Also according to the invention, a method of making a ceramic article comprises impregnating a porous ceramic article with an organosilicon compound which is liquid or in (preferably oxygen-free) solution and which has a molecular weight not exceeding 1000, and heat-treating the impregnated article at 600°–1700° C. in a vacuum or inert atmosphere.

According to a further feature of the invention, after the reaction sintering a further (optionally repeated) step is carried out, comprising packing the reaction-sintered article in a particulate (preferably refractory) medium capable of absorbing volatile oxides evolved on heating the article, the particulate medium comprising a reducing agent or precursor thereof, and heating to at least 1400° C. The reducing agent may be SiC or another refractory oxygen-free silicon-containing compound, the latter preferably containing nothing except Si, C, N and H, and the particulate medium ("burying meal") may also include a refractory, preferably BN. This getters residual $B_2O_3$ evolved from the article.

According to a yet further feature of the invention, after the reaction sintering and whether or not the "burying meal" step is used, the step may be performed of soaking, infiltrating or otherwise impregnating the article resulting from the method with an organosilicon compound, which is itself liquid or which is in the form of a solution (preferably oxgyen-free), the organosilicon compound having a molecular weight not exceeding 1000, and heat-treating the impregnated article at 600°–1700° C. in a vacuum or inert atmosphere. The organosilicon compound will preferably yield an inorganic residue on pyrolysis at 1000°–1200° C. of at least 70% by mass and may be or may include an oligomethylhydridesilane; a mixture of in situ copolymerisable oligosilanes may be used, the MW of these preferably not exceeding 800, all to keep the viscosity low.

The invention extends to ceramic articles made as set forth above, such as grommets, crucibles and thermal, electrical or structural components, which may be 20 mm thick or more without difficulty.

The invention can be performed with reasonably inexpensive raw materials, using conventional equipment and without going to excessive temperatures.

The invention will now be described by way of example.

FEATURE 1

Boron nitride powder is synthesised from boron-nitrogen and oxygen-containing compounds according to the process disclosed in U.S. Pat. No. 3,241,919, using urea and boric acid in an ammonia atmosphere in a reduced-pressure furnace for 30 hours, and has a disordered turbostratic structure and a chemically bound oxgyen content by mass of 15%, more if the structure is more disordered (not counting the oxygen present as $B_2O_3$ which is later removed by alcohols or other suitable solvent). This powder is collected and heat-treated at 1300°–1500° C. in an inert atmosphere, for sufficient time until no further change in structure occurs at the chosen temperature, to achieve partial graphitisation of the structure, i.e. a change from turbostratic to mesographitic structure with the oxygen content kept down to 5–10% by mass. This structural change is continuous, the 'mesographitic' structure being a semiamorphous intermediate between the turbostratic and strictly hexagonal structures. Then the powder is washed with water or technical-grade alcohol to remove uncombined $B_2O_3$ to below 1½% by mass. This washing cannot be performed earlier because the boron nitride before the heat treatment is very reactive and would react with the washing water/alcohol.

A method of hydrodynamic semi-dry moulding (e.g. explosive compaction under 30 to 500 MPa) on metal cores of a mixture of 92–95%, by mass, of this disordered-structure boron nitride and 5–50% reaction sintering agent including in this example 5–8%, by mass, of amorphous boron, with the addition of about 1 or 2%, in dry weight, of elastomer dissolved in 'petroleum ether' hydrocarbon solvent, then follows. The moulded article is fired in a nitrogen atmosphere at 1400 or 1500°–1800° C. over the time necessary to nitride the boron throughout the entire bulk of the article and for the forming $B_2O_3$ to vaporise away completely.

The amount of additive, in this example boron, to be put into the mixture is fixed in accordance with the oxgyen content of the BN powder. The larger the oxygen content of the BN powder, the greater the quantity of boron that should be added to the mixture, since part of the boron goes into the formation of boric anhydride and only the leftover part is reacted with the matrix and/or gas, e.g. is nitrided, forming BN and compacting the ceramic.

The addition of 5–8%, by mass, of amorphous boron permits the achieving of a complete nitriding throughout the entire bulk of thick-walled articles, to bring down the $B_2O_3$ content to 0.2%, by mass, and lower, to avoid the development of stresses and, also, to reduce production costs. Less boron may be acceptable where mechanical strength is not a key characteristic, as in large-sized articles like crucibles, electric insulators or containers. In every case, however, the boron must be at least equal to the chemically bound oxygen in the boron nitride with which it is mixed.

A lower strength as a result of using less boron can, to a large extent, be compensated for by an appropriate choice of the moulding method and parameters for yielding a higher density. Although isostatic pressing can be used, hydrodynamic pressing, through its even, allover compression of even a large intricately-shaped article with working fluid, achieves a high density and a high degree of uniformity in the density of moulded articles, and prevents the occurrence of internal stresses. The hydrodynamic pressure is chosen, within the range of 50–300 MPa, depending on the size of the load and so as to ensure a packing density of the particles that is best for the subsequent diffusion processes during reaction sintering.

Reaction sintering is done in a nitrogen atmosphere under up to 1.0 MPa pressure and with the final temperature of 1500°–1800° C. Since the total heat evolved by the nitriding reaction is small when the boron content is as low as 5–8%, this heat cannot be relied upon to drive the sintering, and therefore the bottom limit of the furnace temperature for sintering cannot be below 1500° C. This however allows a shorter sintering time. Raising the pressure of nitrogen in the working chamber of the oven to 0.03 MPa and above will intensify the sintering process and facilitate the nitriding of boron throughout the entire bulk of the article, and with 0.2 MPa pressure the speed of nitriding no longer, in practical terms, depends on the thickness of the article's walls. Because such a pressure could slow the evolution of $B_2O_3$ from within the thickness of the article, the pressure may be reduced to zero from time to time, e.g. in a two-hourly pressure/evacuation cycle.

EXAMPLE 1 OF FEATURE 1

To shape a large-size thick-walled article, with walls up to 50 mm thick—say, a grommet—a mixture of 95%, by mass, of washed boron nitride powder and 5%, by mass, of elemental amorphous (or crystalline) boron powder of >10 $m^2/g$ is prepared and mixed with a small amount of binding agent, being a 2% solution of elastomer in 'petroleum ether' hydrocarbon solvent. The boron nitride powder has previously been synthesised and heat-treated at 1500° C. for 1 hour as described above. It now has a mesographitic structure and the oxygen content in it is 6–7% by mass, i.e. less than can react with all the elemental boron. The prepared mixture is packed around the sides of a powder metal core and an elastic sleeve is slipped over it so that the mixture is retained in the shape of a grommet. The shape of the core dictates the inner shape of the article; to obtain the desired parameters of the article, additional perforated packing can be added on the outer side.

The construction (core, powder mixture and elastic sleeve) is then placed in the chamber of a hydrodynamic machine filled with working fluid (in this case, water), where the article is compacted with an explosion of 300 MPa force.

The formed article is taken out of the cover and dried at 100° C. to remove the hydrocarbon solvent for the rubber. Then the article is buried in ground scrap boron nitride powder for reaction sintering. (This scrap BN powder does not sinter to the formed article because it contains no impurity or agent which could promote sintering. Other powders could in theory be used but none, so far, have proved as successful as BN, bearing in mind that the chosen powder must getter oxygen.) The reaction sintering is done by firing in an electric resistance vacuum furnace in nitrogen atmosphere under 0.05 MPa pressure with the final temperature of 1600° C. held for 10 hours.

The resulting article has 30% porosity and high electric resistance $\sim 10^{12}\Omega.m$; the $B_2O_3$ content does not exceed 0.5%, by mass, in the material; its flexural strength is 25–40 MPa. The article is stable against thermal shock and withstands repeated cyclical heating and cooling within the 20°–2000° C. temperature range, without losing its performance characteristics.

EXAMPLE 2 OF FEATURE 1

To shape an article with 10 mm-thick walls, a crucible, for example, a mixture of boron nitride, 92% by mass, and boron, 8% by mass, is used. The boron nitride powder is pre-heat-treated at 1300° C.; it has a pronounced turbostratic structure tending to mesographitic and contains up to 10%, by mass, of oxygen. The process of moulding and compaction is analogous to the one described in Example 1 above, under 150 MPa pressure in the chamber of the hydrodynamic machine. Reaction sintering was carried out in a way analogous to that described in Example 1, but under 0.03 MPa nitrogen pressure and with the final temperature at 1500° C., for 10 hours.

The overall content of metallic additions in the resulting ceramic does not exceed 10% by mass; the $B_2O_3$ content is not more than 0.2% by mass; flexural strength is 30–50 MPa and does not decrease, at least up to 1400° C. The resulting crucible is stable against thermal shock and exposure to melted metals or glass; its high thermal conductivity and isotropic properties ensure a rapid and even heating through the entire bulk of the processed body. The crucible maintains its performance characteristics even after it has been used 10 times to melt titanium.

EXAMPLE 3 OF FEATURE 1 (BN+Al)

A disordered-structure BN powder containing ~9% by mass of oxygen is mixed with 30% by mass of fine-grained aluminium powder (3–5 $m^2/g$). The mixture is compacted by semi-dry moulding into the shape of a cut-off ring for a horizontal steel casting machine (diameter up to 250 mm; thickness up to 25 mm), then fired in a vacuum to 1200° C. and in a nitrogen atmosphere, to 1500° C.

Composition of the resulting ceramic article, in diminishing order of components: BN, $Al_2O_3$, AlN, $9Al_2O_3*2B_2O_3$. The BN content is about 60% by mass. The article has a mechanical strength of 40–60 MPa, high thermal stability and resistance to aggressive melts. It is fit for prolonged use in an inert or low-oxidising medium.

EXAMPLE 4 OF FEATURE 1 (BN+Al)

80% by mass of disordered-structure BN powder, containing ~5% by mass of oxygen, is mixed with 20% by mass of fine-grained aluminium powder (3–5 $m^2/g$). The mixture is compacted by hydrodynamic pressing as described above into the shape of an electrical insulation insert or a protective cover. The article is fired in a nitrogen atmosphere to 1450° C.

Composition of the resulting ceramic article, in diminishing order of components: BN, AlN, $Al_2O_3$. The BN content is about 70% by mass. The article has a mechanical strength of 40–80 MPa, electrical resistance $\sim 10^n \Omega m$ where n~10, high thermal stability and resistance to erosion and aggressive melts. It is fit for prolonged use in an inert or low-oxidising medium with sharp temperature drops and in contact with metal melts.

EXAMPLE 5 OF FEATURE 1 (BN+Al+B)

70% by mass of disordered-structure BN powder, containing ~6% by mass of oxygen, is mixed with 25% by mass of fine-grained aluminium powder (3–5 $m^2/g$) and 5% by mass of fine-grained boron powder (5–10 $m^2/g$). The mixture is compacted by hydrodynamic pressing into the shape of a grommet, ring or core. The article is fired in a nitrogen atmosphere to 1550° C.

Composition of the resulting ceramic article, in diminishing order of components: BN, AlN, $AlB_2$, $Al_2O_3$. The BN content is about 70% by mass. The article has a mechanical strength of 70–80 MPa, electrical resistance $\sim 10^{10}\Omega m$, density over 1.7 $g/cm^3$, high thermal stability and resistance to erosion and aggressive melts. It is fit for prolonged use as a structural component, e.g. a thermocouple protective cover, in an inert or low-acid medium with sharp temperature drops.

EXAMPLE 6 OF FEATURE 1 (BN+Ti)

A disordered-structure BN powder containing ~8% by mass of oxygen is mixed with 15% by mass of fine-grained titanium powder (10–15 m$^2$/g). The mixture is compacted by hydrodynamic pressing into the shape of a boat, crucible or evaporator-kettle, then fired in a nitrogen atmosphere to 1600° C.

Composition of the resulting ceramic article, in diminishing order of components: BN, TiB$_2$, TiN. The BN content is about 80% by mass. The article has a high thermal stability and resistance to aluminium melts. It is fit for prolonged use in an inert atmosphere or vacuum as a resistive element in an aluminium evaporator.

EXAMPLE 7 OF FEATURE 1 (BN+Ti+Al)

A disordered-structure BN powder containing ~8% by mass of oxygen is mixed with 10% by mass of fine-grained titanium powder (10–15 m$^2$/g) and 10% by mass of fine-grained aluminium powder (3–5 m$^2$/g). The mixture is compacted by hydrodynamic pressing into the shape of a tube or plate, then fired in a nitrogen atmosphere to 1550° C.

Composition of the resulting ceramic article, in diminishing order of components: BN, AlN, Al$_2$O$_3$, TiN, TiB$_2$. The BN content is about 70% by mass. The article has a high thermal stability and a mechanical flexural strength of 20–30 MPa. The article is stable against thermal shock and aluminium melts. It is fit for prolonged use in an inert atmosphere or vacuum as the protective cover of a sensor for dipping into metal melts for metallurgical monitoring.

EXAMPLE 8 OF FEATURE 1 (BN+TiH$_2$)

A disordered-structure BN powder containing ~8% by mass of oxygen is mixed with 15% by mass of fine-grained titanium hydride powder (10–15 m$^2$/g). The mixture is compacted by hydrodynamic pressing into the shape of a boat, crucible or evaporator-kettle, then fired in a nitrogen atmosphere to 1600° C.

Composition of the resulting article, in diminishing order of components: BN, TiB$_2$, TiN. The BN content is about 80% by mass. The article has a high thermal stability and resistance to molten aluminium. It is fit for prolonged use in an inert atmosphere or vacuum as a protective element in an aluminium evaporator.

EXAMPLE 9 OF FEATURE 1 (BN+Si+Al)

A mixture of 4.2% by mass of silicon powder (3–5 m$^2$/g), 12.5% by mass of aluminium powder (5–10 m$^2$/g), 82.3% by mass of turbostratic boron nitride powder and 1% by mass of rubber binder is prepared for moulding. The boron nitride powder is pre-heat-treated at 1500° C. and contains 6–7% by mass of oxygen. The prepared mixture is packed into a mould for cold semi-dry moulding and compacted under 0.5–1 tonne/cm$^2$ pressure into the shape of a 7×7×70 mm parallelepiped.

The formed article is taken out of the mould and placed in a boron nitride particulate medium for reaction sintering. The firing is done in an electric resistance vacuum furnace in a nitrogen atmosphere under 0.05 MPa pressure at a final sintering temperature of 1600° C. for 10 hours.

The resulting article has a high electric resistance, ~10$^{11}$Ω.m; the material, as shown by X-ray phase-by-phase and chemical analyses, is 75% hexagonal-structure boron nitride and 20–25% sialon, the B$_2$O$_3$ content in the material not exceeding 0.5% by mass; its mechanical flexural strength is 20–30 MPa. The article is stable against thermal shock and can undergo repeated thermal cycling between 20° C. and 2000° C. in an inert medium without losing its performance characteristics.

EXAMPLE 10 OF FEATURE 1 (BN+Si+Al+B)

A mixture of 5.5% by mass of silicon powder (3–5 m$^2$/g), 16.6% by mass of aluminium powder (5–10 m$^2$/g), 16.6% by mass of amorphous boron powder (3–5 m$^2$/g), 60.2% by mass of turbostratic boron nitride powder and 1% by mass of rubber binder is prepared for moulding. The boron nitride powder is pre-heat-treated at 1500° C. and contains 6–7% by mass of oxygen. The prepared mixture is packed into a mould for cold semi-dry moulding and compacted under 0.5–1 tonne/cm$^2$ pressure into the shape of a 7×7×70 mm parallelepiped.

The formed article is taken out of the mould and placed in a boron nitride particulate medium for reaction sintering. The firing is done in an electric resistance vacuum furnace in a nitrogen atmosphere under 0.05 MPa pressure at a final sintering temperature of 1600° C. for 10 hours.

The resulting article has high electric resistance, ~10$^{10}$Ω.m; the material, as shown by an X-ray phase-by-phase and chemical analyses, consists of 70% hexagonal-structure boron nitride and 25–30% sialon, the B$_2$O$_3$ content in the material not exceeding 0.5% by mass; its mechanical flexural strength is 30–45 MPa. The article is stable against thermal shock and can undergo repeated thermal cycling between 20° C. and 2000° C. in an inert medium without losing its performance characteristics.

EXAMPLE 11 OF FEATURE 1 (BN+B$_{10}$H$_{12}$*2NH$_3$)

85 parts of boron nitride, pre-heat-treated at 1500° C. and containing 6–7% by mass of oxygen, are mixed with 15 parts by mass of decaborane diammine (formula: B$_{10}$H$_{12}$*2NH$_3$, obtained from the reaction of decaborane B$_{10}$H$_{12}$ with ammonia without additional purifying) in the form of a 5–10% acetonitrile solution. After 0.5–1 hour of stirring at 60°–70° C., benzol (half of the volume of the decaborane diammine solution) is added to the mixture. After 10 minutes' stirring, the solvent is boiled off in a vacuum at 100° C. The resulting boron nitride powder with the added decaborane diammine is placed in a crucible and heat treated in an electric vacuum furnace in an argon or helium atmosphere to 700° C. The resulting powder is mixed, in petrol, with 1% by mass of rubber binder and dried. The prepared mixture is packed into a mould for cold semi-dry moulding and compacted under 0.5–1 tonne/cm$^2$ pressure into the shape of a 7×7×70 parallelepiped.

The formed article is taken out of the mould and placed in a boron nitride particulate medium for reaction sintering. The firing is done in an electric resistance vacuum furnace in a nitrogen atmosphere under 0.05 MPa pressure at a final sintering temperature of 1600° C. for 10 hours.

The resulting article has high electric resistance, ~10$^{13}$Ω.m; the material, as shown by X-ray phase-by-phase and chemical analyses, is pure hexagonal-structure boron nitride, the B$_2$O$_3$ content in the material not exceeding 0.5% by mass; its mechanical flexural strength is 30–40 MPa. The article is stable against thermal shock and can undergo repeated thermal cycling between 20° C. and 2000° C. in an inert medium without losing its performance characteristics.

EXAMPLE 12 OF FEATURE 1 (BN+meta-B$_{10}$C$_2$H$_{10}$(CH$_2$OH)$_2$)

85 parts of boron nitride, pre-heat-treated at 1500° C. and containing 6–7% by mass of oxygen, is mixed with 15 parts by mass of meta-carborandiol (meta B$_{10}$C$_2$H$_{10}$(CH$_2$OH)$_2$) in the form of a 10% solution in benzol. After 10 minutes' stirring, the solvent is boiled off in a vacuum at 100° C. The resulting boron nitride powder with the added meta-carborandiol is put into a crucible and heat treated in an electric vacuum furnace in an argon or helium atmosphere to 900° C. The resulting powder is mixed, in petrol, with 1% by mass of rubber binder and dried. The prepared mixture is packed into a mould for cold semi-dry moulding and compacted under 0.5–1 tonne/cm² pressure into the shape of a 7×7×70 mm parallelepiped.

The formed article is taken out of the mould and placed in a boron nitride particulate medium for reaction sintering. The firing is done in an electric resistance vacuum furnace in a nitrogen atmosphere under 0.05 MPa pressure at a final sintering temperature of 1600° C. for 10 hours.

The resulting article has high electric resistance, $\sim 10^{13} \Omega.m$; the material, as shown by X-ray phase-by-phase and chemical analyses, is pure hexagonal-structure boron nitride, the $B_2O_3$ content in the material not exceeding 0.5% by mass; its mechanical flexural strength is 30–40 MPa. The article is stable against thermal shock and can undergo repeated thermal cycling between 20° C. and 2000° C. in an inert medium without losing its performance characteristics.

EXAMPLE 13 OF FEATURE 1 (BN+poly-carboranosilanes)

(We use the word poly-carboranosilanes to mean polymers whose main chain comprises silane links —Si—NH—Si—NH— alternating with inserted carborane fragments of the —$B_{10}C_2H_{10}$— type.)

One part by mass of meta-carborandiol $B_{10}C_2H_{10}$ $(CH_2OH)_2$ is dissolved in a 20% solution in benzol of 2 parts by mass of oligomethylhydridesilane (molecular mass about 800), and the mixture is stirred until the gas is completely vaporised away. The resulting solution of poly-carboranosilane is mixed with 20 parts by mass of boron nitride which has been pre-heat treated at 1500° C. and contains 6–7% by mass of oxygen. After 10 minutes' stirring, the solvent is boiled off in a vacuum at 100° C. The resulting boron nitride powder with the added poly-carboranosilane is packed into a mould for cold semi-dry moulding and compacted under 0.5–1 tonne/cm² pressure into the shape of a 7×7×70 mm parallelepiped.

The shaped article is taken out of the mould and placed in a boron nitride particulate medium for reaction sintering. The firing is done in an electric resistance vacuum furnace in a nitrogen atmosphere under 0.05 MPa pressure at a final sintering temperature of 1600° C. for 10 hours.

The resulting article has high electric resistance, $10^{10} \Omega.m$; the material, as shown by X-ray phase-by-phase and chemical analyses, is hexagonal-structure boron nitride with up to 5% in total of carbide and silicon nitride, the $B_2O_3$ in the material not exceeding 0.5% by mass; its mechanical flexural strength is 30–40 MPa The article is stable against thermal shock and can undergo repeated thermal cycling between 20° C. and 2000° C. in an inert medium without losing its performance characteristics.

FEATURE 2

As is known, and was mentioned in Example 1 of Feature 1, boron nitride ceramic articles may be buried in BN "meal" for firing. Such burying offers a number of technological advantages. Firstly, the high thermal conductivity of BN ensures good heat conduction and, therefore, low temperature gradients throughout the bulk of the articles. Secondly, the high absorption by the "meal" of oxygen, moisture and other impurities in the commercial-grade nitrogen atmosphere in the furnace prevents the ceramic article itself from oxidising. At the same time, it is important that the "meal" should be capable of absorbing the volatile elements released from the article undergoing reaction sintering. The firing improves the strength and the purity of the articles but does not affect their porosity.

The process of boron nitride sintering is directly associated with the escape of residual oxygen in the form of $B_2O_3$ vapour from the bodies of the individual BN particles to their surfaces, and then, to the surface of the article. The evacuation of boron oxides from ceramic articles proceeds rather slowly, especially in the case of thick-walled items. Therefore it is very important that the burying "meal" in which ceramic articles are sintered should promote the evacuation of the residual oxygen.

The pure BN "meal" used in boron nitride sintering is good at absorbing $B_2O_3$ vapours. However, the $B_2O_3$ sorption-desorption in burying "meal" is a reversible process, therefore the "meal" does give rise to a positive $B_2O_3$ vapour pressure, which opposes and therefore may slow down the evacuation of boron oxide from the ceramic articles. From this point of view, there is an advantage in subsequently using a second burying "meal" that creates a reducing atmosphere where B—O bonds are replaced with B—N bonds, whereby to remove any remaining $B_2O_3$ in the interests of high purity and high strength.

Thus, in addition to purging the previously reaction-sintered boron nitride ceramic article of boron oxide, the subsequently used second burying "meal" according to this Feature of the invention promotes its strengthening, as follows. Inter-particle contacts are the spots of higher concentration of residual oxygen, and it is here, to a large extent, that $B_2O_3$ reduction reactions take place, the harder B—N bond replacing the B—O bond, which encourages further sintering and strengthening of the ceramic article. This sintering thus takes the form of increasing the strength of the adhesion bond between BN particles where they are already in contact, without however densifying the powder.

The two "meals" cannot be combined since the elemental boron present at the stage of the first meal would react with any additives which might be used in the second meal.

The process of further sintering in a reducing atmosphere according to this Feature of the invention may in practice be carried out by firing the articles buried in this second "meal", consisting of SiC or other refractory oxygen-free silicon compound ROSC, either alone or with another particulate medium. A mixture of a boron nitride "meal" and an ROSC (SiC) powder is preferred. This burying mixture has high thermal conductivity and good gas permeability and provides additional protection for the article surface from the impurities in the gaseous atmosphere of the furnace.

Silicon carbide is a highly specific reducing agent suitable for this purpose, as are other ROSCs for use above 1400° C. (i.e. in the range of SiO temperature stability). The reduction process can be summed up in the following equation (using SiC as an example):

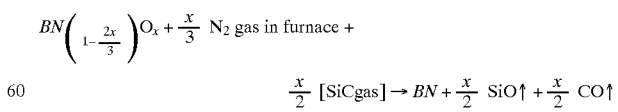

[SiC gas] in this case denotes the gaseous phase that is present, spread evenly over the SiC surface, in the nitrogen atmosphere and which contains not only SiC vapour proper, but also its dissociation products (Si) and the products of its reaction with nitrogen ($C_2N_2$, CN . . . ).

Although SiC is the best ROSC for strength enhancement, an alternative version of this burying mixture is obtained by using a boron nitride "meal" impregnated with silicon compounds which, during pyrolysis, produce a more than 10%, by mass, output of SiC and other ROSC. Using such compounds ensures that there is no localised depletion in Si. The molecular weight of such compounds is of no consequence.

It may again be noted that firing in a burying "meal" containing SiC (ROSC) or its precursors according to this Feature is a separate technological operation and that it cannot overlap with reaction sintering for the reason, already briefly noted above, that Si-containing vapours would enter into a reaction with the unnitrided boron of the charge, forming undesirable silicon borides. Silicon borides do not yield to nitriding under sintering conditions, and the strength of the ceramic, in such a case, would decline sharply and its dielectric properties would be irreversibly impaired.

EXAMPLE 1 OF FEATURE 2

The article made (including reaction-sintering) following Example 1 of Feature 1 is subjected to firing while buried in SiC powder (5–20 μm-diameter particles) at 1700° C., for two hours in a nitrogen atmosphere. The resulting article has 50–60 MPa flexural strength at 20° C. and retains it at the same level all the way up to 1500° C. The $B_2O_3$ content is 0.2–0.3% by mass. Other technical characteristics of the article, such as electric resistance and stability against thermal shock, remain at the same level as before.

EXAMPLE 2 OF FEATURE 2

The article made (including reaction-sintering) following Example 2 of Feature 1 is fired in boron nitride "meal" impregnated with a 5% oligomethylhydride-silane solution at 1700° C. for two hours in a nitrogen atmosphere. Oligomethylhydride silane solutions are further described in Feature 3, although a wider range thereof can be used in this, Feature 2.

The resulting article has 60–70 MPa flexural strength. The $B_2O_3$ content is 0.2–0.3% by mass.

FEATURE 3

This Feature is for the manufacture of fully dense structural ceramic composite materials.

The platelet shape of boron nitride powder particles inevitably causes isotropic ceramics made of it to have a highly porous structure, even when sintering is done at extreme temperatures. The open porosity of such material can amount to 35–40% by volume, which results in relatively low strength.

One of the most effective ways of improving the properties of sintered materials is to impregnate them with organoelemental compounds, then to subject them to pyrolysis until useful inorganic residues are formed. A wide range of impregnating compounds is conventionally used, depending on the requirements and purpose of the material; the selected compound preferably contains the highest possible proportion of the elements comprising the required inorganic residue, and may be for example an organosilicon compound (OSC) containing Si—O—Si, Si—N—Si and Si—C bonds. Due to the presence of these bonds, the compounds are pyrolysed down to $SiO_2$, $Si_3N_4$ and SiC, which residues are conducive to strengthening the sintered materials and protecting them against oxidising.

It should be taken into account that, despite high porosity, by volume, in sintered BN ceramics, the pores are small in size, with typical "effective radius" of 1000–1500 A. Therefore, a full-depth impregnation of samples thicker than 10–12 mm with high-molecular-weight OSC solutions (MW=2000) is difficult in principle. The presence of high-molecular-weight components in the composition of tars greatly increases the viscosity of the solutions and creates a predisposition for an uneven impregnation of the articles, with low-molecular fragments penetrating through the pores of the ceramic to a great depth, but then being able to flow away equally easily, and high-molecular fragments concentrating in the surface layer.

The use according to the present Feature of low-molecular oxygen-free oligomers (MW up to ~1000) with a low molecular weight distribution which polymerise before they pyrolyse and which have a yield of at least 70% in useful residue (e.g. SiC, $Si_3N_4$) on pyrolysis, permits inhomogeneity to be avoided in the resulting ceramic materials. Oligomethylhydridesilane (OMHS) can serve as an example of such a compound. Its relatively low molecular weight (600–650) and the absence of high-molecular components in its composition make it possible to achieve an acceptably even impregnation of large-sized BN articles (=with walls up to 60 mm thick), and its pyrolysis results in a satisfactorily high yield of inorganic residues; over 80–85% by mass in the case of pyrolysis up to 1000°–1400° C. (when the intermediate SiC or $SiC_xN_y$ is formed) and 40–45% by mass when pyrolysed to 1600° C. and beyond (when SiC predominates in the composition of the by-products). This high yield is necessary to ensure both high density of the product and minimisation of harmful internal evolution of gases in the article.

An example of a compound which can achieve a high yield at heat treatment above 1600° C. is a mixture of oligomers, the main ones of which are:

and

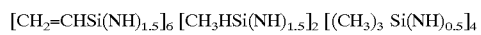

with structures typically based on

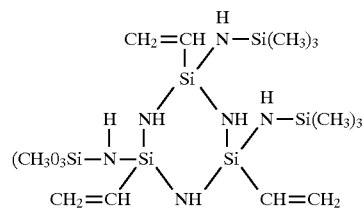

with average molecular weight ~800. This is a compound of low viscosity and relatively stable properties. Impregnation with this can be done in a rather concentrated form—with 80–90% solutions in light hydrocarbons such as pentane, hexane etc. The yield of inorganic residues is high and approaching the theoretical maximum—up to 50–53%, by mass, of silicon carbide after pyrolysis at T≧1600° C., If the process of impregnation needs to be intensified to the maximum, mixtures of this or similar oligomers and "active diluents" can be used. Reactive oligomers with MW 300–600, capable of copolymerisation with the main component of the mixture, can be used as such active diluents. For example, this specific oligomer can be combined with 25% by mass of oligomethylhydridesilane oligomer:

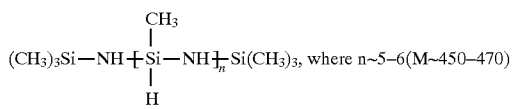

A mixture like this can copolymerise in the pores of the ceramic at above 100° C., and the resulting copolymer has a high yield of desired inorganic residue. (Polymerisation is necessary so that, after the oligomers have been infiltrated throughout the article, they then remain in position (and do not drain away) during pyrolysis.)

Analogously, low-molecular polycarbosilanes of the structure

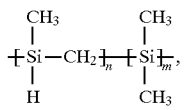

where n≧m and MW avg ~400–600
can be used for the same purposes and with the same result.

EXAMPLE 1 OF FEATURE 3

A reaction-sintered article with 50 mm thick walls, made following Example 1 of Feature 1, is impregnated with an 80% by mass solution in petrol of oligomethylhydridesilane with MW avg ~650 for 72 hours. The impregnated article is dried at 100° C., then heat-treated in nitrogen at a temperature rising slowly to 1400° C. This procedure first polymerises the oligomethylhydridesilane, thus locking it in situ, and then pyrolyses it, thus filling the pores evenly throughout the thickness of the article with refractory residue of composition close to SiC. The duration of the heating will depend on the thickness of the article, since even the centre must reach 1400° C. for an adequate time, and in this case was 48 hours, including holding at 1400° C. for 4 hours.

The resulting article has a flexural strength of 70–90 MPa at 20° C. and of 80–100 MPa at 1500° C. The specific volume electric resistance is $10^{13}\Omega.m$. Oxidisability at 1300° C. is five times lower than that of the material made following Example 1 of Feature 1. The life of the article under conditions of thermal erosion in a low-oxidising medium (viz, gaseous petrol combustion products) at 1500°–2000° C. is 10 times longer than that of pure boron nitride.

EXAMPLE 2 OF FEATURE 3

An article—a crucible with 10 or 100 mm thick walls—made following Example 2 of Feature 1, is impregnated for 48 hours with a 90% by mass solution in a low-boiling "petroleum ether" hydrocarbon mixture of the 3:1 mixture described in the third-last paragraph of Feature 3 of oligomer MW avg ~800 and oligomethylhydridesilane, MW avg ~450. After drying at 100° C., the crucible is slowly heated in nitrogen up to 1600° C. taking 30 hours, including holding at 1600° C. for 10 hours. The resulting crucible has a flexural strength of 70–90 MPa at 20° C. and 80–100 MPa at 1500° C. The open porosity has been reduced by 45–50% as against the material made following Example 2 of Feature 1. The crucible withstands 10–15 heats of aluminium (at boiling temperature), while a crucible of pure boron nitride can only be used for 2–3 heats.

Although it would not often be required, Feature 3 can be applied to a material made according to Features 1+2.

We claim:

1. A method of making a boron nitride ceramic article from a mixture of mesographitic boron nitride powder and a reaction sintering agent other than elemental boron powder, comprising shaping the mixture into the form of the article, compacting the shaped mixture under pressure and reaction sintering the compacted mixture in a vacuum or inert or nitrogen atmosphere, wherein the mesographitic boron nitride contains from 5 to 10% by mass chemically bound oxygen, and the reaction sintering agent is at least stoichiometrically equivalent to the chemically bound oxygen and can react chemically with the available B, N and/or O under the sintering conditions to form only refractory compounds including a minor proportion of volatile products.

2. A method according to claim 1, wherein the reaction sintering agent comprises a metal powder.

3. A method of making a boron nitride ceramic article from a mixture of mesographitic boron nitride powder and elemental boron powder, comprising shaping the mixture into the form of the article, compacting the shaped mixture under pressure and reaction sintering the compacted mixture in a vacuum or nitrogen atmosphere, wherein the mesographitic boron nitride contains from 5 to 10% by mass chemically bound oxygen, and the elemental boron is at least stoichiometrically equivalent to the chemically bound oxygen, further comprising the step of impregnating the resulting article with an organosilicon compound, which is itself liquid or which is in the form of a solution, the organosilicon compound having a molecular weight not exceeding 1000, and heat-treating the impregnated article at 600°–1700° C. in a vacuum or inert atmosphere.

4. A method according to claim 1, wherein the compaction is hydrodynamic.

5. A method according to claim 4, wherein the hydrodynamic compaction is done by an explosive shock wave in a hydraulic fluid surrounding the shaped mixture.

6. A method of making a boron nitride ceramic article from a mixture of mesographitic boron nitride powder and elemental boron powder, comprising shaping the mixture into the form of the article, hydrodynamically compacting the shaped mixture by an explosive shock wave in a hydraulic fluid surrounding the shaped mixture, and reaction sintering the compacted mixture in a vacuum or nitrogen atmosphere, wherein the mesographitic boron nitride contains from 5 to 10% by mass chemically bound oxygen, and the elemental boron is at least stoichiometrically equivalent to the chemically bound oxygen.

7. A method according to claim 4, wherein the hydrodynamic compaction is done under 50–300 MPa.

8. A method according to claim 1, further comprising the step of impregnating the resulting article with an organosilicon compound, which is itself liquid or which is in the form of a solution, the organosilicon compound having a molecular weight not exceeding 1000, and heat-treating the impregnated article at 600°–1700° C. in a vacuum or inert atmosphere.

9. A method according to claim 1, wherein the reacting sintering is performed in nitrogen at a partial pressure which may exceed 0.03 MPa.

10. A method according to claim 3, wherein the elemental boron or other reaction sintering agent is in the form of powder with specific surface of at least 10 $m^2/g$.

11. A method according to claim 10, wherein the elemental boron is amorphous.

12. A method according to claim 3, wherein the elemental boron comprises from 5–8% by mass of the mixture.

13. A method according to claim 3, wherein the starting boron nitride is turbostratic boron nitride which, before mixing with the elemental boron or other reaction sintering agent, has been pre-heat-treated to equilibrium at a temperature of from 1300° to 1500° C.

14. A method according to claim 13, wherein the heat-treated boron nitride has a specific surface of at least 100 m$^2$/g.

15. A method according to claim 1, further comprising, after the reaction sintering, the steps of packing the reaction-sintered article in a particulate medium capable of absorbing volatile oxides evolved on heating the article, the particulate medium comprising a reducing agent or precursor thereof, and heating to at least 1400° C.

16. A method according to claim 15, wherein the reducing agent is silicon carbide or another refractory oxygen-free silicon-containing compound or a precursor thereof.

17. A method according to claim 16, wherein the compound or precursor contains only atoms selected from the group consisting of Si, C, N, B and H.

18. A method according to claim 15, wherein the particulate medium also comprises a refractory.

19. A method according to claim 18, wherein the particulate medium is boron nitride plus a refractory oxygen-free silicon-containing compound or a precursor thereof.

20. A method according to claim 3, wherein the organosilicon compound is one which yields an inorganic residue on pyrolysis at 1000°–1200° C. of at least 70% by mass.

21. A method according to claim 3, wherein the organosilicon compound polymerises before it pyrolyses.

22. A method according to claim 3, wherein the organosilicon compound is or comprises an oligomethylhydridesilane.

23. A method according to claim 22, wherein a mixture of in situ copolymerisable oligosilanes is used.

24. A method according to claim 21, wherein the organosilicon compound is a least one oligosilane having a MW not exceeding 800.

25. A method according to claim 2, wherein said metal powder comprises Al, Si, Ti, B, a powdered hydride of Al, Si, Ti or B, or an non-organic compound of Al, Si, Ti or B.

26. A method according to claim 3, wherein said solution of said organosilicon compound is oxygen-free.

27. A method according to claim 8, wherein said solution of said organosilicon compound is oxygen-free.

28. A method according to claim 15, wherein said packing and heating steps are repeated.

29. A method according to claim 15, wherein said particulate medium is refractory.

30. A method according to claim 18, wherein said refractory is boron nitride.

* * * * *